(12) United States Patent
Sanada et al.

(10) Patent No.: US 11,289,249 B2
(45) Date of Patent: Mar. 29, 2022

(54) PERMANENT MAGNET, ROTARY ELECTRICAL MACHINE, AND VEHICLE

(71) Applicant: KABUSHIKI KAISHA TOSHIBA, Tokyo (JP)

(72) Inventors: Naoyuki Sanada, Kawasaki Kanagawa (JP); Shinya Sakurada, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 321 days.

(21) Appl. No.: 16/283,856

(22) Filed: Feb. 25, 2019

(65) Prior Publication Data

US 2019/0189313 A1    Jun. 20, 2019

Related U.S. Application Data

(63) Continuation of application No. PCT/JP2018/007838, filed on Mar. 1, 2018.

(30) Foreign Application Priority Data

Aug. 30, 2017 (JP) .............................. JP2017-165534

(51) Int. Cl.
*H01F 1/053* (2006.01)
*C22C 38/00* (2006.01)
(Continued)

(52) U.S. Cl.
CPC ........... *H01F 1/053* (2013.01); *C22C 38/001* (2013.01); *C22C 38/005* (2013.01); *C22C 38/02* (2013.01);
(Continued)

(58) Field of Classification Search
None
See application file for complete search history.

(56) References Cited

U.S. PATENT DOCUMENTS 5,750,044 A * 5/1998 Yoneyama ............ H01F 1/0596
148/301
6,758,918 B2 * 7/2004 Iriyama ................. B22F 1/0055
148/101

(Continued)

FOREIGN PATENT DOCUMENTS

CN  105810381   7/2016
JP   54-142121   11/1979
(Continued)

OTHER PUBLICATIONS

Machine translation of JP 2007-324618A. (Year: 2007).*
International Search Report and Written Opinion for International Application No. PCT/JP2018/007838 dated Jun. 7, 2018, 10 pages.

*Primary Examiner* — Xiaowei Su
(74) *Attorney, Agent, or Firm* — Amin, Turocy & Watson, LLP

(57) ABSTRACT

The permanent magnet includes: a main phase expressed by a composition formula: $RM_zN_x$ and having at least one crystal structure selected from the group consisting of a $Th_2Ni_{17}$ crystal structure, a $Th_2Zn_{17}$ crystal structure, and a $TbCu_7$ crystal structure; and a sub phase having a phosphorus compound phase containing a phosphorus compound excluding a phosphoric acid compound.

14 Claims, 4 Drawing Sheets

(51) Int. Cl.
*C22C 38/02* (2006.01)
*C22C 38/12* (2006.01)
*H01F 1/059* (2006.01)
*H01F 1/055* (2006.01)
*C22C 38/14* (2006.01)
*C22C 38/18* (2006.01)
*C22C 38/10* (2006.01)
*C22C 38/04* (2006.01)
*C22C 38/08* (2006.01)
*C22C 38/28* (2006.01)
*H02K 7/00* (2006.01)

(52) U.S. Cl.
CPC .............. *C22C 38/04* (2013.01); *C22C 38/08* (2013.01); *C22C 38/10* (2013.01); *C22C 38/12* (2013.01); *C22C 38/14* (2013.01); *C22C 38/18* (2013.01); *C22C 38/28* (2013.01); *H01F 1/059* (2013.01); *H01F 1/0551* (2013.01); *H01F 1/0557* (2013.01); *H01F 1/0596* (2013.01); *H02K 7/003* (2013.01); *B22F 2998/10* (2013.01); *B22F 2999/00* (2013.01); *C22C 2202/02* (2013.01)

(56) References Cited

U.S. PATENT DOCUMENTS

| | | |
|---|---|---|
| 2001/0054453 A1 | 12/2001 | Sakurada et al. |
| 2002/0008444 A1 | 1/2002 | Sakata et al. |
| 2004/0025975 A1 | 2/2004 | Nobutoki et al. |

FOREIGN PATENT DOCUMENTS

| | | | |
|---|---|---|---|
| JP | 60-144906 | | 7/1985 |
| JP | 07-118815 | | 5/1995 |
| JP | 11-087118 | | 3/1999 |
| JP | 2001-230108 | | 8/2001 |
| JP | 2002-075767 | | 3/2002 |
| JP | 2002-313614 | | 10/2002 |
| JP | 2003-007521 | | 1/2003 |
| JP | 2003-142306 | | 5/2003 |
| JP | 2006-165218 | | 6/2006 |
| JP | 2007-277692 | | 10/2007 |
| JP | 2007324618 A | * | 12/2007 |
| JP | 2008-010726 | | 1/2008 |
| WO | 2002103719 | | 12/2002 |

* cited by examiner

PERMANENT MAGNET, ROTARY ELECTRICAL MACHINE, AND VEHICLE

CROSS-REFERENCE TO RELATED APPLICATIONS

This application is a continuation of prior International Application No. PCT/JP2018/007838 filed on Mar. 1, 2018, which is based upon and claims the benefit of priority from Japanese Patent Application No. 2017-165534 filed on Aug. 30, 2017; the entire contents of all of which are incorporated herein by reference.

FIELD

Embodiments described herein relate generally to a permanent magnet, a rotary electrical machine, and a vehicle.

BACKGROUND

Rare-earth magnets, such as a Sm—Co magnet and a Nd—Fe—B magnet, are known as high-performance permanent magnets. Rare-earth magnets are used in electrical apparatuses, such as a motor, a speaker, and a measuring device, and are also used in vehicles, such as a hybrid electric vehicle (HEV) and an electric vehicle (EV). Nowadays, there is an increasing demand for the reduction in size of various electrical apparatuses, and there is also an increasing demand for motors to be used in HEVs and EVs. To address such demands, development of a permanent magnet that aims to improve the maximum magnetic energy product $(BH_{max})$ is expected.

With regard to magnetic materials for obtaining a higher-performance permanent magnet, for example, a combination of a rare-earth element and a transition-metal element, such as Fe, is highly promising. Sm—Fe—N materials have high saturation magnetization comparable to that of Nd—Fe—B materials and large magnetic anisotropy exceeding that of the Nd—Fe—B materials. Thus, the application of the Sm—Fe—N materials in a high-performance magnet is expected.

It is necessary to pulverize a magnetic alloy powder into approximately several μm to form a high-density bulk magnet or a bond magnet by kneading with a resin, by using Sm—Fe—N magnetic materials. High magnetic properties with high filling factor are thereby able to be obtained. The magnetic alloy powder is normally pulverized in inert gas or solvent. Fine powders after the pulverization have extremely high activity, and powder surfaces are oxidized by slight contact with oxygen, resulting in that the magnetic properties are lowered. One of factors of the lowering the magnetic properties is that rare-earth elements in the alloy are oxidized by an oxidation reaction, and an α-Fe phase lowering a coercive force is precipitated.

Since the Sm—Fe—N magnetic materials suffer from a disadvantage in that they undergo thermal decomposition upon being heated at a temperature of approximately 550° C. or higher, the Sm—Fe—N magnetic materials are thermally decomposed, resulting in that the α-Fe phase is precipitated when densification process through sintering is applied to obtain high-density.

DETAILED DESCRIPTION

A permanent magnet of an embodiment includes: a main phase expressed by a composition formula: $RM_ZN_X$ (R is at least one element selected from the group consisting of rare-earth elements, Zr, Nb, and Hf, M is at least one element selected from the group consisting of Fe and Co, X is an atomic ratio satisfying $0.5 \leq X \leq 2.0$, and Z is an atomic ratio satisfying $4 \leq Z \leq 13$), and having at least one crystal structure selected from the group consisting of a $Th_2Ni_{17}$ crystal structure, a $Th_2Zn_{17}$ crystal structure, and a $TbCu_7$ crystal structure; and a sub phase having a phosphorus compound phase containing a phosphorus compound excluding a phosphoric acid compound.

Embodiments of the present invention will be hereinafter described with reference to the drawings. The same reference signs denote the same ones. It should be noted that the drawings are schematic or conceptual, and a relation between thickness and width of each part, a coefficient of ratio of sizes among parts, and so on are not necessarily the same as actual ones. Further, even the same part may be illustrated with different dimensions and coefficients of ratio in different drawings.

First Embodiment

Figure 1:
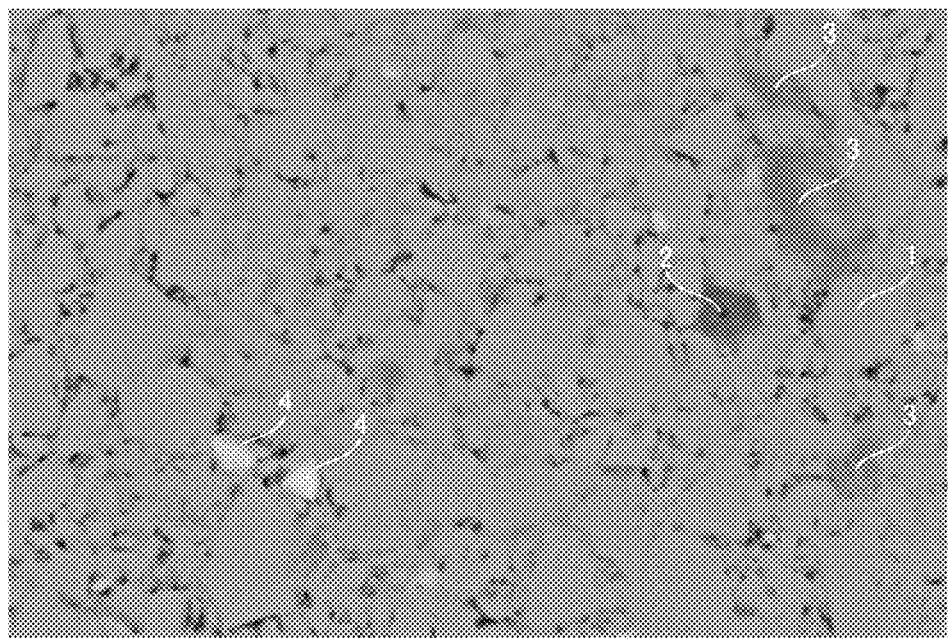
FIG. 1 is a view illustrating an example of an SEM observation image of a cross-section of a permanent magnet.

An example of a permanent magnet of an embodiment will be described. FIG. 1 is a view illustrating an example of an SEM (scanning electron microscope) observation image of a cross-section of the permanent magnet. A structure illustrated in FIG. 1 includes main phases 1 and sub phases. The sub phases include phosphorus compound phases 2, α-Fe phases 3, and oxide phases 4. The main phases 1 are phases having the highest volume occupancy ratio among each crystal phase and amorphous phase in the permanent magnet. The phosphorus compound phases 2 are phases having the volume occupancy ratio lower than the main phases 1. The α-Fe phases 3 and the oxide phases 4 have the volume occupancy ratio lower than the main phases 1 and are each different from the phosphorus compound phases 2.

A composition of the main phase 1 is expressed by the following composition formula (1).

$$RM_ZN_X \qquad (1)$$

(In the formula, R is at least one element selected from the group consisting of rare-earth elements, Zr, Nb, and Hf, M is at least one element selected from the group consisting of Fe and Co, X is an atomic ratio satisfying $0.5 \leq X \leq 2.0$, and Z is an atomic ratio satisfying $4 \leq Z \leq 13$)

In the composition formula (1), the element R is at least one element selected from the group made up of rare-earth elements, zirconium (Zr), niobium (Nb), and hafnium (Hf). As the rare-earth elements, there can be cited, for example, yttrium (Y), lanthanum (La), cerium (Ce), praseodymium (Pr), neodymium (Nd), samarium (Sm), and so on. As the element R, one kind of element may be used, or a plurality of kinds of elements may be used. The element R imparts high magnetic anisotropy and high coercive force to the magnet. It is preferable that 50 atomic % or more of the element R is Sm. It is desirable that 70 atomic % or more of the element R is Sm. The use of the rare-earth element as the element R can increase performance, in particular, the coercive force of the permanent magnet with high reproducibility.

Nitrogen (N) exists in crystal lattices of the main phases 1 and the sub phases. Nitrogen contained in the crystal lattices enlarges the crystal lattices to change an electronic structure. This improves the Curie temperature, magnetic anisotropy, and saturation magnetization of the permanent magnet. The atomic ratio of nitrogen is 0.5 or more and 2.0 or less when the atomic ratio of the element R is 1. That is, X is an atomic ratio satisfying $0.5 \leq X \leq 2.0$. X is more preferably an atomic ratio satisfying $1.0 \leq X \leq 1.5$. When X is less than 0.5, the permanent magnet cannot sufficiently have the effect imparted by nitrogen contained therein. When X is over 2.0, the saturation magnetization and so on of the permanent magnet decrease.

Part of nitrogen may be replaced with at least one element selected from hydrogen (H), boron (B), and carbon (C). As the replacing element, one kind of element may be used or a plurality of kinds of elements may be used. The replacing element achieves an effect similar to that of nitrogen described above. However, replacing too much of nitrogen leads to a decrease in the magnetic anisotropy or the like of the permanent magnet. It is preferable that 50 atomic % or less of nitrogen is replaced with the aforesaid element.

The element M is at least one element selected from the group consisting of iron (Fe) and cobalt (Co). As the element M, one kind of element may be used or a plurality of kinds of elements may be used. The element M is an element mainly responsible for the magnetization of the permanent magnet. As the content of the element M is relatively high, the saturation magnetization of the permanent magnet can be increased. However, if the content of the element M is too high, hetero-phases such as the α-Fe phase precipitate to decrease the coercive force.

It is preferable that 50 atomic % or more of the element M is Fe. It is more preferable that 70 atomic % or more of the element M is Fe. Fe in the element M contributes to especially improvement of the magnetization of the permanent magnet. The permanent magnet containing Co as part of the element M can have a higher Curie temperature to have improved heat stability. Further, the coercive force of the permanent magnet also increases.

Part of the element M may be replaced with at least one element selected from the group consisting of titanium (Ti), vanadium (V), tantalum (Ta), molybdenum (Mo), tungsten (W), manganese (Mn), nickel (Ni), zinc (Zn), and germanium (Ge). As the replacing element, one kind of element may be used or a plurality of kinds of elements may be used. The element that replaces part of the element M contributes to improvement of magnetic properties, for example, the coercive force. However, replacing too much of the element M leads to a decrease in the magnetization of the permanent magnet. It is preferable that 20 atomic % or less of the element M, further, 10 atomic % or less of the element M is replaced with the aforesaid element.

Part of the element M may be replaced with at least one element selected from the group consisting of chromium (Cr) and silicon (Si). Cr, Si increase the thermal decomposition temperature of an R-M-N permanent magnet. Cr or Si mainly replaces a site occupied by the element M in the main phases. Cr can enhance the heat stability of crystals by changing the number of d-electrons in the crystals. Si can enhance the heat stability of the crystals by reducing the size of the crystal lattices. By both Cr and Si contained in the permanent magnet, it is possible to suppress the thermal decomposition of the R-M-N permanent magnet in a sintering process, and to suppress precipitation of the α-Fe phase. It is preferable that 20 atomic % or less of the element M, further, 10 atomic % or less of the element M is replaced with the aforesaid element.

The main phase 1 has at least one crystal structure selected from the group consisting of a $Th_2Ni_{17}$ crystal structure, a $Th_2Zn_{17}$ crystal structure, and a $TbCu_7$ crystal structure. The main phase 1 has an R-M-N phase such as, for example, a $Sm_2Fe_{17}N_3$ phase.

The phosphorus compound phase 2 is a phase containing a phosphorus compound excluding a phosphoric acid compound. Phosphorus is an element forming a stable compound by reacting with the element M and the rare-earth elements. When the phosphorus compound phase 2 contains the phosphoric acid compound, the coercive force of the permanent magnet may be lowered.

There can be cited at least one compound selected from the group consisting of, for example, RP, $RP_2$, $RP_5$, $Mi_2P_7$, $M_2P_3$, $M_3P$, $M_2P$, MP, $MP_2$, and $MP_4$ as the phosphorus compound. As the phosphoric acid compound, there can be cited a phosphate containing the element M.

When a large amount of the α-Fe phase 3 exists in the permanent magnet, a magnetization-reversal nucleus is likely to be generated to be a factor lowering the coercive force of the permanent magnet. The oxide phase 4 is, for example, an oxide phase of the element R. A large amount of the oxide phase 4 causes to lower the saturation magnetization of the permanent magnet, and therefore, the amount is preferably small.

The phosphorus compound phases 2 is formed by sintering an alloy powder where phosphorus is adhered on or reacted with a surface of the alloy particle, between crystal grains or at grain surfaces of the main phases 1. Phosphorus adhered on or reacted with the surface forms a compound containing phosphorus and Fe or the rare-earth element on the surface of the powder to prevent oxidation of the powder surface. Further, the sintering process causes reaction between the phosphorus or the phosphorus compound and α-Fe phase 3, which precipitated by the thermal decomposition of the main phase 1 in sintering, to form the phosphorus compound phase 2. This decreases the hetero-phases such as the α-Fe phase 3.

When a phosphate film containing the element M is formed at the surface of the alloy powder, the phosphate containing the element M forms a hydrate. For example, a hydrate of ferric phosphate is dehydrated at about 330° C. to change into a ferric phosphate anhydride. The phosphate film is decomposed at high-temperature to generate oxygen gas. Accordingly, there is a possibility that the surface of the magnetic powder is damaged due to oxygen and moisture derived from the phosphate film at a heat treatment time such as sintering to lower the properties of the permanent magnet such as the coercive force.

A volume ratio of a total amount of the phosphorus compound phase 2 in the permanent magnet is preferably 0.1% or more to suppress oxidation of the alloy powder surface due to the existence of the phosphorus compound phases 2. The volume ratio of the total amount of the phosphorus compound phase 2 with respect to a total amount of the sub phase is preferably 50% or more. Meanwhile, a large amount of the phosphorus compound phase 2 causes to lower the saturation magnetization of the permanent magnet. It is therefore preferable that the volume ratio of the total amount of the phosphorus compound phase 2 in the permanent magnet is 5% or less. Besides, it is preferable that a volume ratio of a total amount of the α-Fe phase 3 in the permanent magnet is 5% or less.

The composition of the permanent magnet is analyzed by, for example, an inductively coupled plasma (ICP) emission spectrochemical analysis method. In the analysis of the composition of the permanent magnet, a powder (alloy powder) is used which is prepared by pulverizing the magnet with a jet mill, a ball mill, or the like and in which volume % of a powder with a 10 μm particle size or more amounts to 3% or less of the total. Samples are randomly picked up ten times from the obtained powder, and these samples are analyzed. An average value of the analyzed measurement values excluding the maximum value and the minimum value is defined as the composition of the permanent magnet.

The main phase 1, the phosphorus compound phase 2, the α-Fe phase 3, and the oxide phase 4 can be identified by a method such as, for example, SEM-EDX (scanning electron microscope-energy dispersive X-ray spectroscopy), TEM-EDX (transmission electron microscope-energy dispersive X-ray spectroscopy), and so on. The TEM-EDX irradiates only the main phase portions, grain boundary phase portions, and the like with an electron beam, and is capable of quantifying a constituent element ratio of each of the portions and identifying the crystal structure thereof.

The method of identifying the main phase 1, the phosphorus compound phase 2, the α-Fe phase 3, and the oxide phase 4 using the SEM-EDX will be described below. An SEM image of a 50 μm×50 μm observation area is obtained. In the SEM image, a continuous region where the concentration of phosphorus is 20 atomic % or more is defined as the phosphorus compound phase 2, a continuous region where the concentration of phosphorus is less than 20 atomic %, the concentration of the element R is 10 atomic % or more, and the concentration of oxygen is less than 40 atomic % is defined as the main phase 1, a continuous region where the concentration of the element M is 90 atomic % or more is defined as the α-Fe phase 3, and a continuous region where the concentration of oxygen is 40 atomic % or more is defined as the oxide phase 4, respectively.

An area ratio of the main phase 1 to the phosphorus compound phase 2 defined according to the above-described manner in the same viewing filed is used as a volume ratio as it is to be calculated, and the calculated value is defined as a volume ratio of the phosphorus compound phase 2 in the permanent magnet. Similarly, an area ratio of the main phase 1 to the α-Fe phase 3 is used as a volume ratio as it is to be calculated, and the calculated value is defined as the volume ratio of the α-Fe phase 3 in the permanent magnet. Similarly, an area ratio of the main phase 1 to the oxide phase 4 is used as a volume ratio as it is to be calculated, and the calculated value is defined as the volume ratio of the oxide phase 4 in the permanent magnet. The volume ratio of the phosphorus compound phase 2, the volume ratio of the α-Fe phase 3, and the volume ratio of the oxide phase 4 are calculated in each of five viewing fields per one permanent magnet according to the above-described method, and the calculated values are added and averaged, and values obtained as a result are defined as the volume ratio of the phosphorus compound phase 2, the volume ratio of the α-Fe phase 3, and the volume ratio of the oxide phase 4 in the permanent magnet, respectively.

In the permanent magnet of the embodiment, the α-Fe phase and phosphorus or the phosphorus compound are reacted, and thereby, it becomes possible to reduce the amount of the α-Fe phase precipitated by thermal decomposition, and to increase density of the permanent magnet without lowering the coercive force. The permanent magnet of the embodiment has the density of 6.5 g/cm$^3$ or more. In the calculation of the density of the permanent magnet, masses of the permanent magnet in the atmosphere and in water are measured, and from the measured values, the density is calculated by an Archimedean method. At this time, the density is calculated ten times per one sample, and an average value of the obtained densities of the permanent magnet excluding the maximum value and the minimum value is defined as the density of the permanent magnet.

Next, an example of a method of manufacturing the permanent magnet of the embodiment will be described. First, an alloy powder containing predetermined amounts of elements is fabricated. The alloy powder is expressed by a composition formula (2). Note that the alloy powder may contain at least one element selected from the group consisting of hydrogen, boron, and carbon.

$$RM_Z \quad (2)$$

In the composition formula (2), an atomic ratio Z indicating a ratio of the total content of the element M excluding the element R to the element R is a number satisfying $4 \leq Z \leq 13$.

For example, the alloy powder is prepared through the pulverization of an alloy ingot obtained through casting of molten metal by an arc melting method or a high-frequency melting method, or is prepared through pulverization of an alloy thin strip fabricated by a molten metal quenching method. Other examples of the method of preparing the alloy powder include a mechanical alloying method, a mechanical grinding method, a gas atomizing method, a reduction diffusion method, and so on. The alloy powder or the alloy not yet pulverized may be heat-treated to be homogenized when required.

The alloy ingot, the alloy thin strip, or the like is preferably pulverized into the alloy powder whose particle size is 45 μm or less. When the particle size of the alloy powder is 45 μm or less, nitrogen can sufficiently enter an inside of the particles to uniformly nitride the whole particles. For the pulverization of the alloy ingot, the alloy thin strip, or the like, a jet mill or a ball mill is used, for instance. An atmosphere for the pulverization of the alloy ingot, the alloy thin strip, or the like is preferably an inert gas atmosphere or the like in order to prevent the alloy powder from oxidizing.

Next, the alloy powder is nitrided. In the nitriding treatment, the alloy powder is heat-treated at a 300 to 900° C. temperature for 0.1 to 100 hours in a nitrogen gas atmosphere at 0.1 to 100 atm. In order to enhance homogeneity of the R-M-N phases, the nitriding treatment is more preferably carried out at a 450 to 750° C. temperature for 2 to 50 hours in the nitrogen gas atmosphere at a pressure of 0.5 to 10 atm. As the atmosphere for the nitriding treatment of the alloy powder, nitrogen compound gas such as ammonia may be used instead of the nitrogen gas. Using gas in which the nitrogen gas or the nitrogen compound gas is mixed with hydrogen makes it possible to control a nitriding reaction as well.

Using the mixed gas of the nitrogen compound gas such as ammonia or the nitrogen gas and the hydrogen gas makes it possible to replace part of nitrogen in the magnetic material with hydrogen. In a case where part of nitrogen is replaced with carbon or boron, carbon or boron may be contained in the alloy powder not yet nitrided, or carbon compound gas, boron compound gas, or the like may be used to make carbon or boron contained therein.

Phosphorus is added to the nitrided alloy powder. As an addition method of phosphorus, there can be cited methods such as kneading with the nitrided alloy powder by a mixer or the like, adding to the ball mill as a dispersing agent, or adding to the jet mill as a coating agent. It is thereby possible to obtain the powder where the surfaces of the nitrided alloy powder are adhered or coated by phosphorus. When an amount of the added phosphorus is too small, an effect by the coating cannot be sufficiently obtained, and when the amount is too large, the volume ratio of phosphorus or the phosphorus compound contained in the permanent magnet becomes large to thereby deteriorate the magnetization of the permanent magnet. The amount of the added phosphorus is preferably 0.1% or more and 10% or less in a mass ratio with respect to the nitrided alloy powder. The volume ratio of the phosphorus compound phase 2 can be controlled by controlling the addition amount of phosphorus.

Next, the powder (nitrided alloy powder) is filled in a mold installed in an electromagnet and press-formed while applying a magnetic field, whereby a compact having oriented crystal axes is manufactured.

Next, the compact is sintered. As a sintering method, a spark plasma sintering method is preferably used. In the spark plasma sintering, it is considered to be easy to make a current selectively flow to surfaces of powder particles, and this method is suitable for densifying the permanent magnet while reducing a heat load applied to the R-M-N phases.

The sintering is preferably carried out in a vacuum atmosphere or an inert gas atmosphere such as argon gas. It is possible to obtain a dense permanent magnet by setting the sintering temperature of the spark plasma sintering to 400 to 700° C. At lower than 400° C., the permanent magnet having a sufficient density cannot be obtained. At higher than 700° C., the thermal decomposition of the permanent magnet progresses, and the α-Fe phases and the like are generated in the permanent magnet, leading to a great deterioration of the magnetic properties of the permanent magnet.

The permanent magnet can be obtained through the above-described processes. The magnetic properties of the obtained permanent magnet can be measured with a vibrating sample magnetometer. The coercive force can be measured as follows. A pulse magnetic field up to 4000 kA/m is applied to a sample in a direction parallel to a direction in which the magnetization is oriented before the sintering, and thereafter a magnetic field in a reverse direction is applied until the magnetization becomes zero, and an absolute value of the magnetic field in the reverse direction measured at this time is defined as the coercive force.

Second Embodiment

The permanent magnet of the first embodiment is usable in rotary electrical machines, for example, a motor and a generator. These rotary electrical machines are each formed of at least a stator and a rotor.

Figure 2:
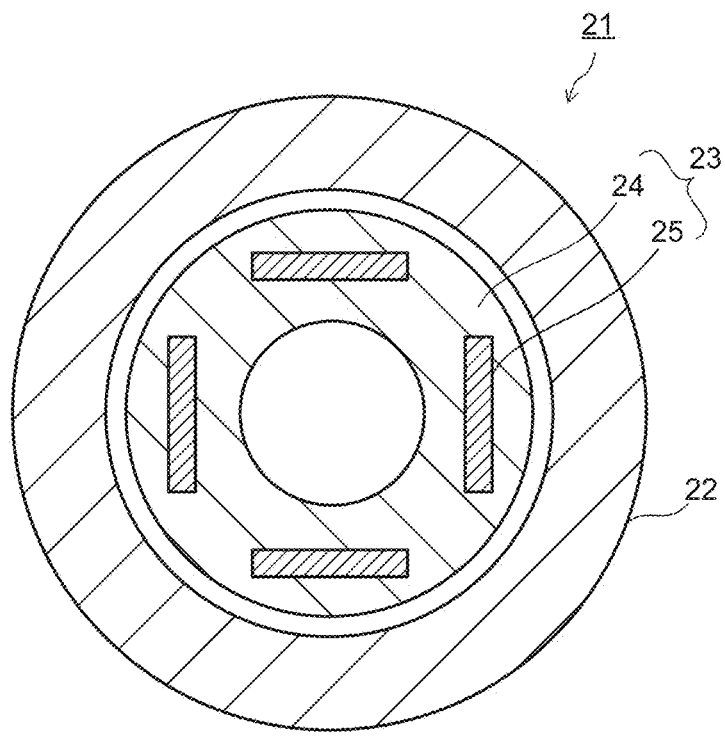
FIG. 2 is a schematic view illustrating a configuration example of a permanent magnet motor.

FIG. 2 is a view illustrating a configuration example of a permanent magnet motor which is a rotary electrical machine using the permanent magnet of the embodiment. A permanent magnet motor 21 is formed of a stator 22 and a rotor 23. The rotor 23 is disposed in the stator 22. The stator 22 rotates the rotor 23. The rotor 23 is formed of an iron core 24 and permanent magnets 25 of the embodiment. Owing to properties and so on of the permanent magnets 25, the efficiency enhancement, downsizing, cost reduction, and so on of the permanent magnet motor 21 are achieved. The permanent magnet motor 21 is suitable as motors for vehicles such as a hybrid electric vehicle and an electric vehicle whose motor is required to have higher power and a reduced size.

Figure 3:
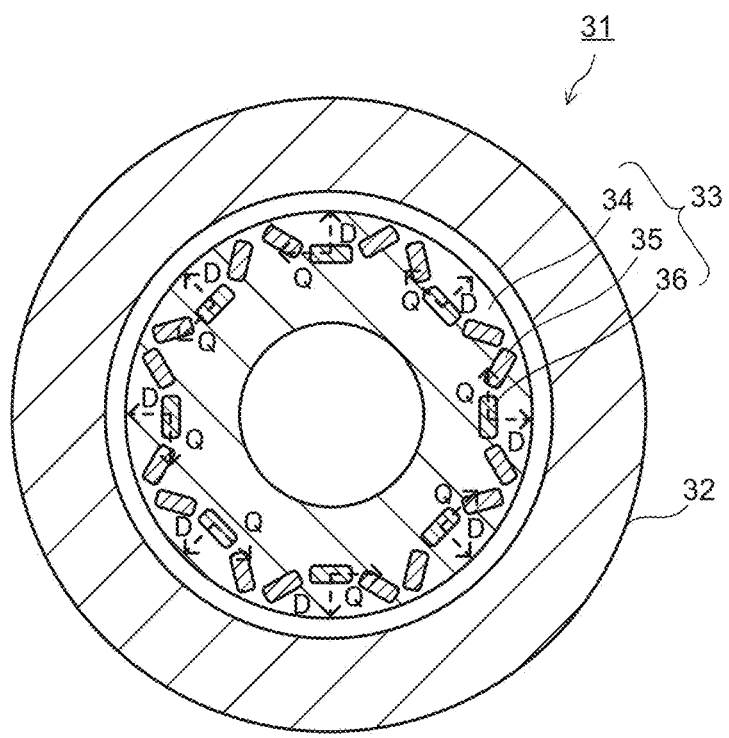
FIG. 3 is a schematic view illustrating a configuration example of a variable magnetic flux motor.

FIG. 3 is a view illustrating a configuration example of a variable magnetic flux motor which is the rotary electrical machine. A variable magnetic flux motor 31 is formed of a stator 32 and a rotor 33. The rotor 33 is disposed in the stator 32. The rotor 33 is formed of an iron core 34, stationary magnets 35, and variable magnets 36. As the stationary magnets 35 and the variable magnets 36, the permanent magnets of the embodiment are used. At least one of the stationary magnets 35 and the variable magnets 36 may be used in the rotor 33.

A magnetic flux density (flux quantum) of the variable magnet 36 is variable. D in FIG. 3 represents a magnetization direction (direction from S toward N) of the variable magnet 36. The magnetization direction of the variable magnet 36 is called a D-axis. The direction to which the D-axis points differs depending on each of the variable magnets 36. A direction perpendicular to the D-axis is called a Q-axis. The magnetic flux density (flux quantum) of the variable magnet 36 is not influenced by a Q-axis current which generates a magnetic field in the Q-axis direction perpendicular to the magnetization direction of the variable magnet 36 (D-axis direction). The magnetic flux density (flux quantum) of the variable magnet 36 can be varied only by the D-axis current which generates a magnetic field in the D-axis direction.

The rotor 33 is provided with a not-illustrated magnetization winding. When a current is passed to the magnetization winding, its magnetic field acts directly on the variable magnets 36. The variable magnetic flux motor 31 is capable of outputting a large torque even if its size is small. The variable magnetic flux motor 31 is suitable as motors for vehicles such as a hybrid electric vehicle and an electric vehicle whose motor is required to have higher power and a reduced size.

Figure 4:
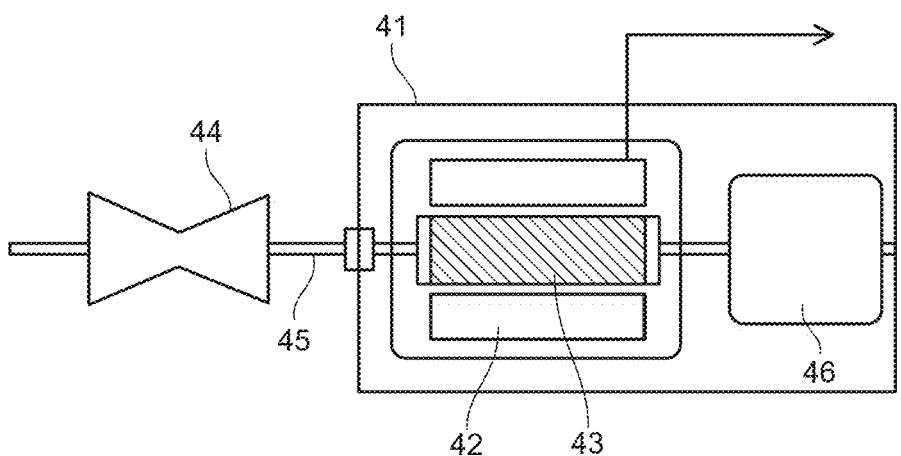
FIG. 4 is a schematic view illustrating a configuration example of a generator.

FIG. 4 is a view illustrating a configuration example of a generator. A generator 41 is formed of a stator 42 using the permanent magnet of the embodiment, a rotor 43, a turbine 44, a shaft 45, and a brush 46. The rotor 43 is connected to the turbine 44 through the shaft 45. The turbine 44 is rotated by an externally supplied fluid. Instead of the turbine 44, dynamic rotation, such as regenerative energy of a vehicle such as an automobile, transmitted to the shaft 45 may rotate the shaft 45. The shaft 45 is connected to a not-illustrated commutator disposed opposite to the turbine 44 across the rotor 43. Electromotive force generated by the rotation of the rotor 43 passes through an isolated phase bus and a main transformer to be boosted to a system voltage and sent as an output of the generator 41. The brush 46 discharges electrostatic charges of the rotor 43.

The generator 41 may be either a normal generator or a variable magnetic flux generator. In the rotor 43, the electrostatic charges are generated by static electricity of the turbine 44 or by a shaft current accompanying the power generation.

Figure 5:
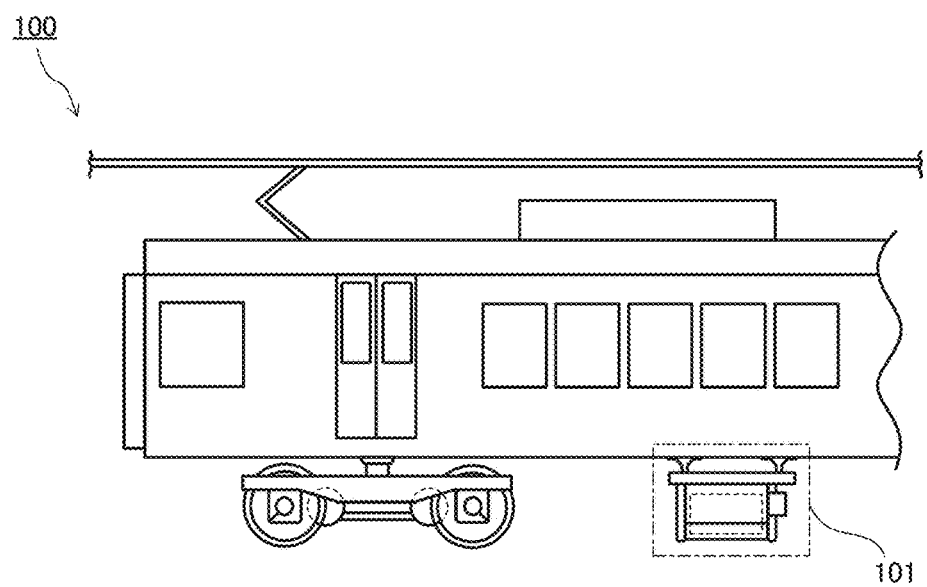
FIG. 5 is a schematic view illustrating a configuration example of a railway vehicle.

The above-described rotary electrical machines may be mounted on, for example, a railway vehicle (example of the vehicle) used for railway traffic. FIG. 5 is a view illustrating a configuration example of a railway vehicle 100 including a rotary electrical machine 101. As the rotary electrical machine 101, any of the motors in FIGS. 2 and 3, the generator in FIG. 4, and the like described above is usable. In a case where the aforesaid rotary electrical machine is mounted as the rotary electrical machine 101, the rotary electrical machine 101 may be used as, for example, an electric motor (motor) that outputs driving force by using power supplied from an overhead wire or power supplied from a secondary battery mounted on the railway vehicle 100, or may be used as a generator which converts kinetic energy into power and supplies the power to various loads in the railway vehicle 100. Using a high-efficient rotary electrical machine like the rotary electrical machine of the embodiment enables the energy-saving traveling of the railway vehicle.

Figure 6:
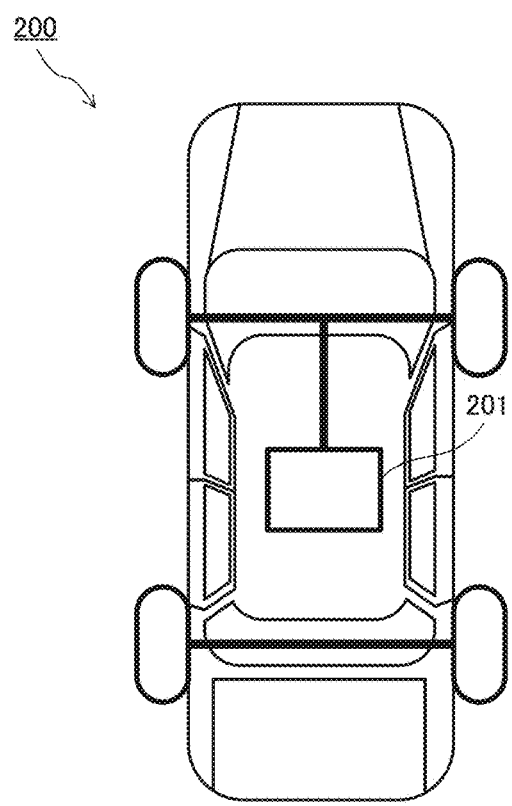
FIG. 6 is a schematic view illustrating a configuration example of an automobile.

The above-described rotary electrical machine may be mounted in an automobile (another example of the vehicle) such as a hybrid electric vehicle or an electric vehicle. FIG. 6 is a view illustrating an example of an automobile 200 including a rotary electrical machine 201. As the rotary electrical machine 201, any of the motors in FIGS. 2 and 3, the generator in FIG. 4, and the like described above is usable. In a case where any of the above-described rotary electrical machines is mounted as the rotary electrical machine 201, the rotary electrical machine 201 may be used as an electric motor that outputs driving force to the automobile 200, or as a generator that converts kinetic energy, which is generated when the automobile 200 is traveling, into power. In addition, the rotary electrical machine may be mounted on, for example, industrial equipment (industrial motor), air-conditioning equipment (air conditioner, hot water supply compressor motor), a wind power generator, or an elevator (hoisting machine).

EXAMPLE

Example 1

Raw materials were blended at a predetermined ratio so that an alloy powder had the composition shown in Table 1, that is, the composition of $SmFe_{8.3}$. The mixture of the blended raw materials was arc-melted in an argon gas atmosphere, whereby an alloy ingot was fabricated. The alloy ingot was heat-treated at about 1000° C. for about three days in the argon gas atmosphere. Subsequently, the alloy ingot was pulverized in a mortar into the alloy powder. The alloy powder was passed through a sieve with a sieve opening of 25 μm. The alloy powder was heat-treated at 500° C. for four hours in a nitrogen gas atmosphere at about 1 atm, whereby a nitrided alloy powder was obtained. Phosphorus is added to the obtained nitrided alloy powder to be 2% in mass ratio, and it was kneaded with a ball mill. The obtained powder was filled in a mold while being oriented by pressing in a magnetic field, and thereafter the powder was subjected to spark plasma sintering under a condition of a 1.0 GPa pressure and a 400° C. sintering temperature, whereby a permanent magnet was obtained. The composition of the main phase of the permanent magnet became the magnet composition shown in Table 1.

Table 2 shows values of the volume ratio of the phosphorus compound phase, and the coercive force of the permanent magnet fabricated in Example 1. The coercive force is represented by a relative value when the coercive force of a permanent magnet fabricated in Comparative example 1 to be described later was set as 100.

Examples 2 to 10

Raw materials were blended at predetermined ratios so that compositions of alloy powders became values shown in Table 1. Besides, 2% in mass ratio of phosphorus was added to the nitrided alloy powder, then they were kneaded with the ball mill. Except the above, permanent magnets were fabricated by the same method as in Example 1. Properties of the obtained permanent magnets were evaluated as in Example 1. Table 2 shows values of the volume ratio of the phosphorus compound phase, and the coercive force in each of the permanent magnets of Examples 2 to 10.

Comparative Examples 1 and 2

Permanent magnets were each fabricated by the same method as that in Examples 1 and 2 except that a subsequent step was carried out without adding phosphorus to the nitrided alloy powder. Properties of the obtained permanent magnets were evaluated as in Example 1. In each of Comparative examples 1, 2, the phosphorus compound phase was not formed. Table 2 shows values of the coercive force in each of the permanent magnets of Comparative examples 1 and 2.

Comparative Example 3

A permanent magnet was fabricated by the same method as that in Example 1 except that a phosphoric acid was added to the nitrided alloy powder instead of phosphorus. Properties of the obtained permanent magnet were evaluated as in Example 1. The phosphorus compound phase was not formed in Comparative example 3. Table 2 shows values of the coercive force in the permanent magnet of Comparative example 3.

TABLE 1

| | Alloy Composition | Composition of Main Phase (Atomic Ratio) |
|---|---|---|
| Example 1 | $SmFe_{8.3}$ | $SmFe_{8.3}N_{1.25}$ |
| Example 2 | $Sm(Cr_{0.08}Si_{0.03}Fe_{0.89})_{8.3}$ | $Sm(Cr_{0.08}Si_{0.03}Fe_{0.89})_{8.3}N_{1.23}$ |
| Example 3 | $Sm(Fe_{0.98}Mn_{0.02})_{8.3}$ | $Sm(Fe_{0.98}Mn_{0.02})_{8.3}N_{1.25}$ |
| Example 4 | $Sm(Fe_{0.97}Ni_{0.03})_{8.5}$ | $Sm(Fe_{0.97}Ni_{0.03})_{8.5}N_{1.46}$ |
| Example 5 | $Sm(Cr_{0.07}Si_{0.03}Fe_{0.86}Zr_{0.04})_{8.4}$ | $Sm(Cr_{0.07}Si_{0.03}Fe_{0.86}Zr_{0.04})_{8.4}N_{1.31}$ |
| Example 6 | $(Sm_{0.90}Pr_{0.10})Fe_{7.1}$ | $(Sm_{0.90}Pr_{0.10})Fe_{7.1}N_{1.08}$ |
| Example 7 | $(Sm_{0.89}Nd_{0.11})Fe_{7.1}$ | $(Sm_{0.89}Nd_{0.11})Fe_{7.1}N_{1.10}$ |
| Example 8 | $(Sm_{0.90}Ce_{0.10})(Cr_{0.08}Si_{0.03}Fe_{0.89})_{7.5}$ | $(Sm_{0.90}Ce_{0.10})(Cr_{0.08}Si_{0.03}Fe_{0.89})_{7.5}N_{1.20}$ |
| Example 9 | $Sm(Fe_{0.98}Al_{0.02})_{7.8}B_{0.02}$ | $Sm(Fe_{0.98}Al_{0.02})_{7.8}B_{0.02}N_{0.88}$ |
| Example 10 | $Sm(Cr_{0.06}Si_{0.02}Fe_{0.92})_{8.0}C_{0.01}$ | $Sm(Cr_{0.06}Si_{0.02}Fe_{0.92})_{8.0}C_{0.01}N_{1.14}$ |
| Comparative Example 1 | $SmFe_{8.3}$ | $SmFe_{8.3}N_{1.25}$ |
| Comparative Example 2 | $Sm(Cr_{0.08}Si_{0.03}Fe_{0.89})_{8.3}$ | $Sm(Cr_{0.08}Si_{0.03}Fe_{0.89})_{8.3}N_{1.25}$ |
| Comparative Example 3 | $SmFe_{8.3}$ | $SmFe_{8.3}N_{1.25}$ |

TABLE 2

|  | Phosphorus Compound Phase Volume Ratio | Coercive Force (Relative Value) |
|---|---|---|
| Example 1 | 2% | 155 |
| Example 2 | 2% | 150 |
| Example 3 | 1% | 140 |
| Example 4 | 2% | 140 |
| Example 5 | 1% | 145 |
| Example 6 | 1% | 130 |
| Example 7 | 4% | 125 |
| Example 8 | 3% | 120 |
| Example 9 | 1% | 135 |
| Example 10 | 2% | 135 |
| Comparative Example 1 | — | 100 |
| Comparative Example 2 | — | 105 |
| Comparative Example 3 | — | 40 |

In each of the permanent magnets (Examples 1 to 10) where phosphorus was added to the nitrided alloy powder, and the sintering was carried out, it was confirmed that the higher coercive force was obtained compared to Comparative examples 1 to 3. This indicates that phosphorus adheres to the surfaces of the nitrided alloy powder or phosphorus coats the surfaces of the nitrided alloy powder, and thereby, oxidation of the surfaces of the alloy powder is suppressed, and phosphorus reacts with the α-Fe phase precipitated in the sintering process to form the phosphorus compound phase, resulting in that the lowering of the coercive force of the permanent magnet is suppressed.

It is to be noted that, although some embodiments of the present invention have been described, these embodiments have been presented by way of example and are not intended to limit the scope of the invention. These novel embodiments can be implemented in a variety of other modes, and various omissions, substitutions, and modifications thereof can be made within the scope that does not depart from the spirit of the invention. Such embodiments and modifications thereof are encompassed by the scope and the spirit of the invention and also encompassed by the invention set forth in the claims and equivalents thereof.

What is claimed is:

1. A permanent magnet comprising:
a main phase expressed by
a composition formula: $RM_ZN_X$
where R is at least one element selected from the group consisting of rare-earth elements, Zr, Nb, and Hf, M is at least one element selected from the group consisting of Fe and Co, X is an atomic ratio satisfying $0.5 \leq X \leq 2.0$, and Z is an atomic ratio satisfying $4 \leq Z \leq 13$, and having at least one crystal structure selected from the group consisting of a $Th_2Ni_{17}$ crystal structure, a $Th_2Zn_{17}$ crystal structure, and a $TbCu_7$ crystal structure; and
a sub phase having a phosphorus compound phase containing a phosphorus compound excluding a phosphoric acid compound, the sub phase being provided between crystal grains of the main phase or on a surface of a crystal grain of the main phase,
wherein a volume ratio of a total amount of the phosphorus compound phase in the magnet is 0.1% or more and 5% or less.

2. The magnet according to claim 1,
wherein 20 atomic % or less of the element M is replaced with at least one element selected from the group consisting of Cr and Si.

3. The magnet according to claim 1,
wherein the phosphorus compound contains at least one selected from the group consisting of RP, $RP_2$, $RP_5$, $M_{12}P_7$, $M_2P_3$, $M_3P$, $M_2P$, MP, $MP_2$, and $MP_4$.

4. The magnet according to claim 1,
wherein 50 atomic % or more of the element R is Sm.

5. The magnet according to claim 1,
wherein 50 atomic % or more of the element M is Fe.

6. The magnet according to claim 1,
wherein 20 atomic % or less of the element M is replaced with at least one element selected from the group consisting of Ti, V, Mn, Ni, Zn, Ga, Ge, Mo, Ta, and W.

7. The magnet according to claim 1,
wherein 50 atomic % or less of the element N is replaced with at least one element selected from the group consisting of H, B, and C.

8. The magnet according to claim 1,
wherein a density of the magnet is 6.5 g/cm$^3$ or more.

9. A rotary electrical machine, comprising:
a rotor; and
a stator,
wherein the rotor or the stator has the magnet according to claim 1.

10. The machine according to claim 9,
wherein the machine is a motor or a generator.

11. A vehicle comprising the machine according to claim 9.

12. A vehicle comprising the machine according to claim 9,
wherein rotation is transmitted to a shaft provided at one end of the machine.

13. A permanent magnet comprising:
a main phase expressed by
a composition formula: $RM_ZN_X$
where R is at least one element selected from the group consisting of rare-earth elements, Zr, Nb, and Hf, M is at least one element selected from the group consisting of Fe and Co, X is an atomic ratio satisfying $0.5 \leq X \leq 2.0$, and Z is an atomic ratio satisfying $4 \leq Z \leq 13$, and having at least one crystal structure selected from the group consisting of a $Th_2Ni_{17}$ crystal structure, a $Th_2Zn_{17}$ crystal structure, and a $TbCu_7$ crystal structure; and
a sub phase having a phosphorus compound phase containing a phosphorus compound excluding a phosphoric acid compound, the sub phase being provided between crystal grains of the main phase or on a surface of a crystal grain of the main phase,
wherein the volume ratio of the total amount of the phosphorus compound phase with respect to a total amount of the sub phase is 50% or more.

14. A permanent magnet comprising:
a main phase expressed by
a composition formula: $RM_ZN_X$
where R is at least one element selected from the group consisting of rare-earth elements, Zr, Nb, and Hf, M is at least one element selected from the group consisting of Fe and Co, X is an atomic ratio satisfying $0.5 \leq X \leq 2.0$, and Z is an atomic ratio satisfying $4 \leq Z \leq 13$, and having at least one crystal structure selected from the group consisting of a $Th_2Ni_{17}$ crystal structure, a $Th_2Zn_{17}$ crystal structure, and a $TbCu_7$ crystal structure; and
a sub phase having a phosphorus compound phase containing a phosphorus compound excluding a phosphoric acid compound, the sub phase being provided between crystal grains of the main phase or on a surface of a crystal grain of the main phase, wherein a volume ratio of a total amount of an α-Fe phase in the magnet is 5% or less.

\* \* \* \* \*